United States Patent
Cerciello (10) Patent No.: US 9,675,988 B2
(45) Date of Patent: Jun. 13, 2017

(54) UNIT FOR SPREADING AN ADHESIVE ONTO A MOVING FILM

(71) Applicant: NORDMECCANICA S.P.A., Piacenza (IT)

(72) Inventor: Antonio Cerciello, Piacenza (IT)

(73) Assignee: NORDMECCANICA S.P.A., Piacenza (IT)

( * ) Notice: Subject to any disclaimer, the term of this patent is extended or adjusted under 35 U.S.C. 154(b) by 0 days.

(21) Appl. No.: 14/780,063

(22) PCT Filed: Mar. 20, 2014

(86) PCT No.: PCT/IB2014/060002
§ 371 (c)(1),
(2) Date: Sep. 25, 2015

(87) PCT Pub. No.: WO2014/155251
PCT Pub. Date: Oct. 2, 2014

(65) Prior Publication Data
US 2016/0038963 A1 Feb. 11, 2016

(30) Foreign Application Priority Data
Mar. 27, 2013 (IT) .............................. PC2013A0011

(51) Int. Cl.
*B05C 1/08* (2006.01)
*B05C 1/12* (2006.01)
(Continued)

(52) U.S. Cl.
CPC .......... *B05C 1/0834* (2013.01); *B05C 1/0873* (2013.01); *B05C 1/12* (2013.01);
(Continued)

(58) Field of Classification Search
CPC ....... B05C 1/0834; B05C 1/12; B05C 1/0873; B05C 1/083; B05C 1/086; B05C 1/0847; B05C 1/003; B32B 37/1284
(Continued)

(56) References Cited

U.S. PATENT DOCUMENTS 2,912,960 A * 11/1959 Black .................... B05C 1/0834
118/202

FOREIGN PATENT DOCUMENTS

EP 0 324 892 A2 7/1989
EP 1 138 395 A2 10/2001
(Continued)

OTHER PUBLICATIONS

International Search Report, dated Jul. 3, 2014, from corresponding PCT application.

*Primary Examiner* — Laura Edwards
(74) *Attorney, Agent, or Firm* — Young & Thompson (57) ABSTRACT

A unit for spreading an adhesive onto a moving film, includes at least one pair of abutments (11) upon which is mounted a first pick-up roller (12) for collecting a quantity of adhesive from a collection zone (13), a second roller (14) that rotates in contact with the first roller (12), intended to receive the quantity of adhesive, and a third roller (15) that rotates in contact with the second roller (14), wherein the abutments include at least one fixed portion (19) and one moving portion (20, 21) that can be firmly connected to the fixed portion, the moving portion being configured: to house a tank (17) in which the adhesive collection zone is found, or to house an additional fourth roller (18) positioned at a given distance from the first roller, the collection zone being located in the upper space between the first and the fourth roller (12, 18).

8 Claims, 6 Drawing Sheets

(51) Int. Cl.
*B05C 1/00* (2006.01)
*B32B 37/12* (2006.01)

(52) U.S. Cl.
CPC .............. *B05C 1/003* (2013.01); *B05C 1/083* (2013.01); *B05C 1/086* (2013.01); *B05C 1/0847* (2013.01); *B32B 37/1284* (2013.01)

(58) Field of Classification Search
USPC ................. 118/202, 244, 261, 262; 156/578; 101/218, 247
See application file for complete search history.

(56) References Cited

FOREIGN PATENT DOCUMENTS

| | | |
|---|---|---|
| EP | 1 710 019 A1 | 10/2006 |
| WO | 02/36343 A1 | 5/2002 |

* cited by examiner

UNIT FOR SPREADING AN ADHESIVE ONTO A MOVING FILM

The present invention relates to a unit for spreading an adhesive onto a moving film and in particular to an adhesive-spreading unit for bonding machines.

To produce laminated films, consisting of several layers of overlying films, generally machines are used in which a first layer of film, for example made of plastic, paper, aluminum or the like, is laminated with at least a second layer of film by means of a thin layer of glue which is applied evenly to one of said two layers before bonding.

To produce said laminated films, two different families of adhesives are typically used, namely solvent-based adhesives and solvent-free adhesives.

Given the chemical-physical differences between these two types of adhesives, and particularly given the large difference in viscosity, the adhesives are usually applied using spreading units designed for use with one specific type of adhesive.

Patent EP1710019 by the same applicant describes an adhesive-spreading unit for bonding machines, suitable for use with solvent-based adhesives.

In these types of spreading unit, the adhesive is contained in a blade chamber in contact with a first roller, the surface of which is engraved so as to obtain a tight pattern of micro-cells into which a small quantity of adhesive can be deposited, and which in turn rotates in contact with a rubber-clad roller on which said micro-cells release the adhesive taken from the blade chamber. The film is advanced in contact with said rubber-clad roller and is held pressed against it so as to transfer a thin layer of adhesive onto its surface.

Transfer from the blade chamber to the first roller and then from the first roller to the second roller is made possible by the low viscosity typical of solvent-based adhesives, which enables the doctor blades to precisely scrape the surface of the first roller and enables the micro-cells to transfer almost all their content onto the surface of the rubber-clad roller, leaving only a negligible amount adhering to the walls of the micro-cell.

Patent EP0324892, again by the same applicant, on the other hand describes an adhesive-spreading unit for bonding machines, suitable for use with solvent-free adhesives.

As is known, these adhesives have a high degree of viscosity (much higher than solvent-based adhesives), which requires the use of spreading machines different from the one described above.

In particular, the high viscosity would result in less efficient scraping of the first engraved roller by the blade chamber (which is essential to determine the quantity of adhesive transferred to the film), and in less efficient depositing of the adhesive onto the second rubber-clad roller due to the strong adhesion of the material onto the walls of the micro-cells.

For these reasons, an adhesive-spreading unit such as that described in patent EP0324892 comprises a steel first roller and a steel second roller positioned almost in contact with the first, but without rotating. An adhesive is fed into the upper zone between said rollers, and is held laterally by walls to form a sort of tank.

The distances of a few hundredths of a millimeter between the first and the second roller causes a uniform layer of film to be deposited on to the second roller, which is then transferred to another rubber-clad roller and lastly to the spreader roller, made of chromium steel, before being transferred to the moving film.

The quantity of adhesive deposited on the film is therefore determined mainly by adjusting the difference in speed between the first and the second roller and the distance between them.

Also in this case, the adhesive-spreading unit described would not be able to work effectively with solvent-based adhesives due to the reduced viscosity, which would not allow effective dosage using the gap between the first two rollers, since the material would easily slide uncontrollably out of said gap.

Despite the fact that the use of solvent-free adhesives is rapidly increasing, particularly given their benefits from the point of view of the environment and the reduced risk of contamination (which is very important for foodstuffs), solvent-based adhesives are still widely used in the packaging sector. For some applications, for example when packaging needs to be treated in an autoclave (for sterilization or other similar reasons), solvent-free adhesives cannot offer the same level of performance as solvent-based adhesives.

For these reasons, it is almost indispensible for a company producing laminates with two or more layers, not only in the packaging sector, to be equipped with machines that can work with solvent-based adhesives, and machines that can work with solvent-free adhesives.

However, depending on demand, a company may find that it is working at full capacity only on one type of machine, leaving other machines idle because they are incompatible with the required product.

It is evident that this can result in a significant loss for the company in terms of the investment made to purchase the machines and for the amount of space they occupy unproductively.

Alternately, in order to maintain full production capacity, the company may be forced to limit its product range based on their compatibility with one of the two types of adhesive.

In this context, the aim of the present invention is to provide a unit for spreading an adhesive onto a moving film, which overcomes the problems of the prior art described above.

In particular, the aim of the present invention is to provide a unit for spreading an adhesive onto a moving film that can work efficiently both with low-viscosity adhesives, such as solvent-based adhesives or water-based adhesives, and with high-viscosity adhesives such as solvent-free adhesives.

More specifically, the aim of the present invention is to provide a unit for spreading an adhesive onto a moving film that can be quickly and simply switched from a configuration for working with low-viscosity adhesives to a configuration for working with high-viscosity adhesives.

A further aim of the present invention is to provide a unit for spreading an adhesive onto a moving film that does not have the same complications as known devices and is therefore reliable and economical.

These aims are substantially achieved by a unit for spreading an adhesive onto a moving film, comprising at least one pair of abutments upon which is mounted:
  a first pick-up roller arranged for collecting a quantity of adhesive from a collection zone;
  a second roller that rotates in contact with said first roller arranged to receive said quantity of adhesive;
  a third roller that rotates in contact with said second roller; characterized in that said abutments comprise at least one fixed portion and one moving portion that can be firmly connected to the fixed portion, said moving portion being configured:

to house a tank in which said adhesive collection zone is found, or to house an additional fourth roller positioned at a given distance from said first roller, said collection zone being located in the upper space between said first and said fourth roller.

In this way, by installing on the abutments the moving portions configured to house a tank, such as a blade chamber for example, the adhesive-spreading unit can be used with low-viscosity adhesives such as solvent-based adhesives. Conversely, by installing on the abutments the moving portion configured to house a fourth roller and said roller, the adhesive-spreading unit can be used with adhesives with a higher viscosity such as solvent-free adhesives.

Advantageously, furthermore, on said second moving portion there may be at least one part of a seat for housing the support shaft for the first pick-up roller, while the remaining part is on the fixed portion of the abutment.

This makes it possible to quickly and easily mount and dismount said first roller when the moving portion is installed or replaced.

A first roller provided with an engraved surface can therefore be used to pick up a quantity of adhesive from the tank, when using low-viscosity adhesives or, vice-versa, a first roller with a smooth surface can be installed substantially next to the fourth roller (i.e. at a distance of a few hundredths of a millimeter) to collect a thin layer of adhesives from the collection zone located in the upper space between said rollers.

Further characteristics and advantages will become more apparent from the indicative and therefore non-limiting description of an example of a preferred but not exclusive embodiment of the invention, illustrated in the accompanying figures, wherein.

With reference to the accompanying drawings, the spreading unit, indicated by the number 10, comprises a pair of facing abutments 11 (in the side views shown only one abutment is visible) arranged for supporting the ends of spreading rollers mounted between them.

Figure 1:
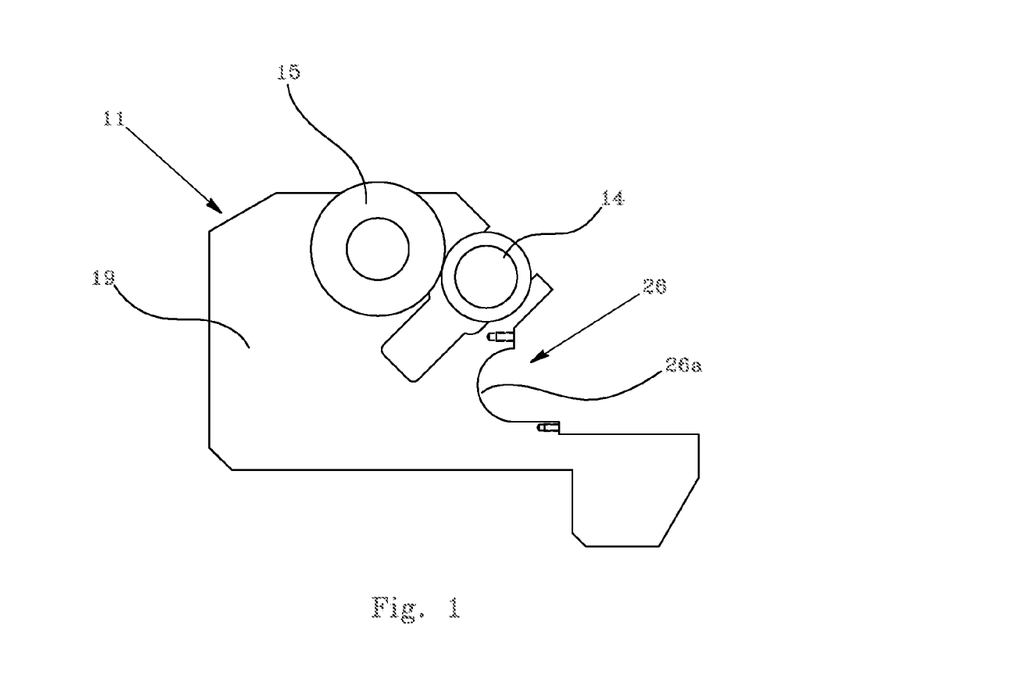
FIG. 1 shows a side view of the spreading unit, according to the invention, in non-operational condition and partially disassembled.
Figure 2A:
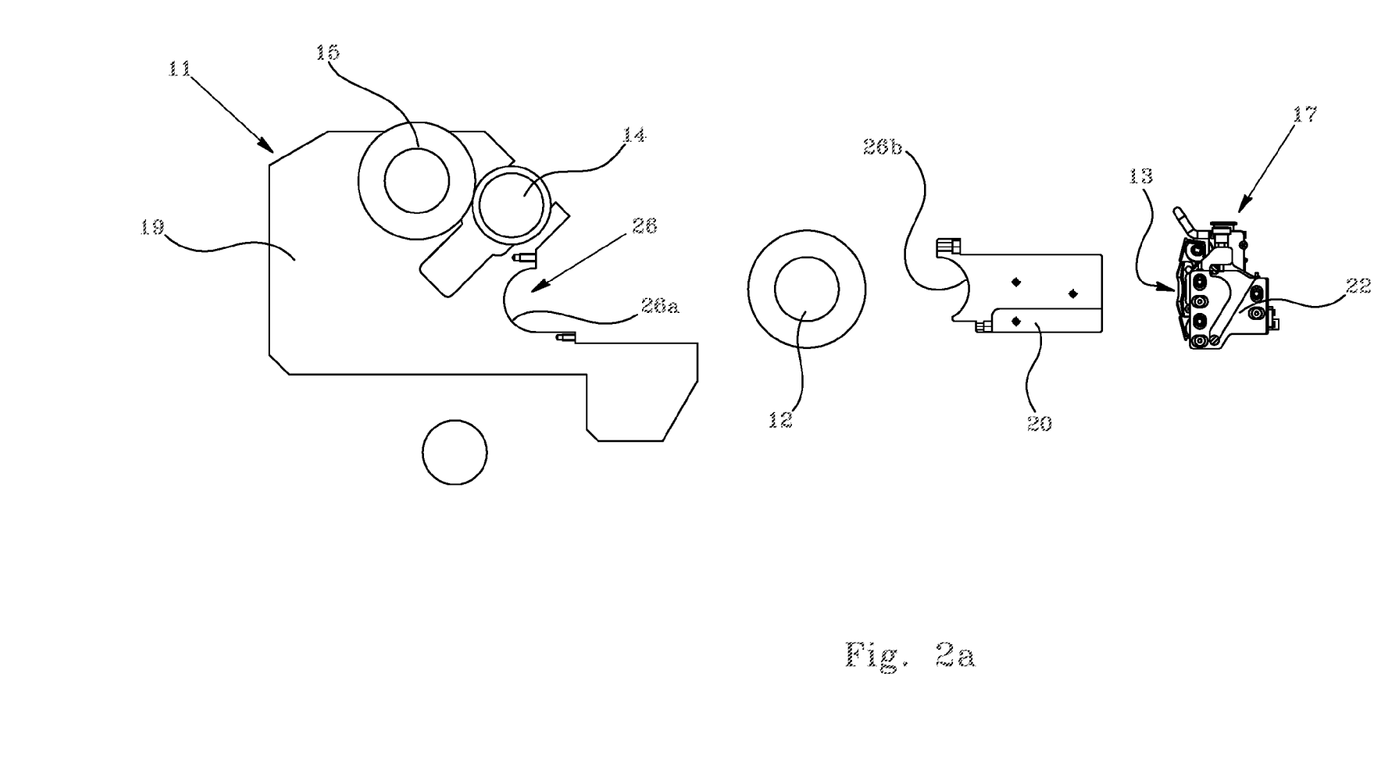
FIG. 2a shows an exploded side view of the spreading unit, according to the invention, in a configuration for use with low-viscosity adhesives.
Figure 2B:
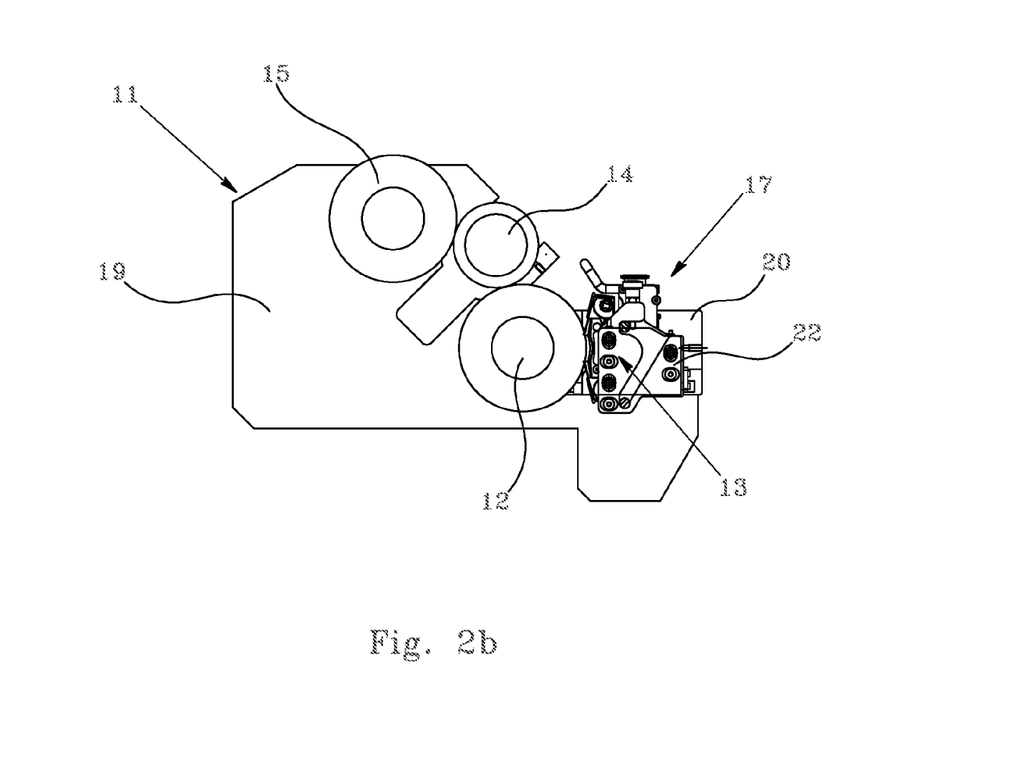
FIG. 2b shows a side view of the spreading unit shown in FIG. 2a in operational condition.

More specifically, on said abutments is mounted at least one first pick-up roller 12, in contact with the adhesive in a collection zone 13 (FIGS. 2b, 3c), arranged for collecting a quantity of said adhesive to transfer it to an adjacent roller.

Even more specifically, said roller is provided with a support shaft with two protruding side ends (not shown in the figure) housed respectively in seats on each of the two abutments, preferably in a fixed manner.

On said abutments 11 is also mounted at least one second roller 14, which rotates in contact with said first roller 12, arranged to receive the quantity of adhesive collected from the collection zone 13 from the first roller 12, and a third roller 15 that rotates in contact with said second roller 14.

The third roller 15 is mounted in a manner similar to the first roller 12, while the second roller 14 may, preferably, be mounted on a support 16 (FIGS. 2c, 3c) that will allow it to make small movements with respect to the first and third roller 12, 15.

A characteristic of the invention is that said abutments 11 comprise at least one fixed portion 19 and one moving portion 20, 21 that can be firmly connected to the fixed portion, for example by screws or other similar coupling means.

According to the invention, said moving portion 20, 21 may be configured to house a tank 17 in which said adhesive collection zone 13 is found (FIGS. 2a-2c) or, alternatively, to house a fourth roller 18. Specifically, said fourth roller 18 is placed substantially in contact with the first roller 12 so that the collection zone 13 is located in the upper space between said two rollers (FIGS. 3a-3c).

This characteristic enables the spreading unit to be transformed from a configuration for use with low-viscosity adhesives, such as solvent-based adhesives or water-based adhesives (FIG. 2b), to a configuration for use with high-viscosity adhesives, such as solvent-free adhesives (FIG. 3b), and vice-versa.

More specifically, in one variant, the moving portion 20 can be configured to house a tank 17 placed next to the first roller 12 so that at least one part of its surface can come into contact with the adhesive collection zone 13 contained inside it.

Advantageously, said tank 17 may comprise a blade chamber 22 firmly connected to the moving portion 20 of each abutment by means of two support brackets 23.

In this configuration the first roller 12 can be an anilox type roller, meaning that it has a surface engraved so as to form micro-cells in which a quantity of adhesive can be deposit. Preferably, the surface of said first roller 12 is made of ceramic material. The blade chamber, preferably, is therefore formed by a pair of blades 24 that, when they are brought into contact with the moving surface of the first roller 12, remove excess adhesive and leave only the quantity contained in the micro-cells.

The adhesive contained in the micro-cells of the first roller 12 is then transferred in a thin layer to the second roller 14 which is rotating in contact with the first.

According to a preferred variant, said second roller 14 is coated with a layer of rubber, and preferably with a layer of vulcanized rubber.

The spreading unit thus configured is therefore suited to working with low-viscosity adhesives, such as solvent-based adhesives or water-based adhesives.

Figure 2C:
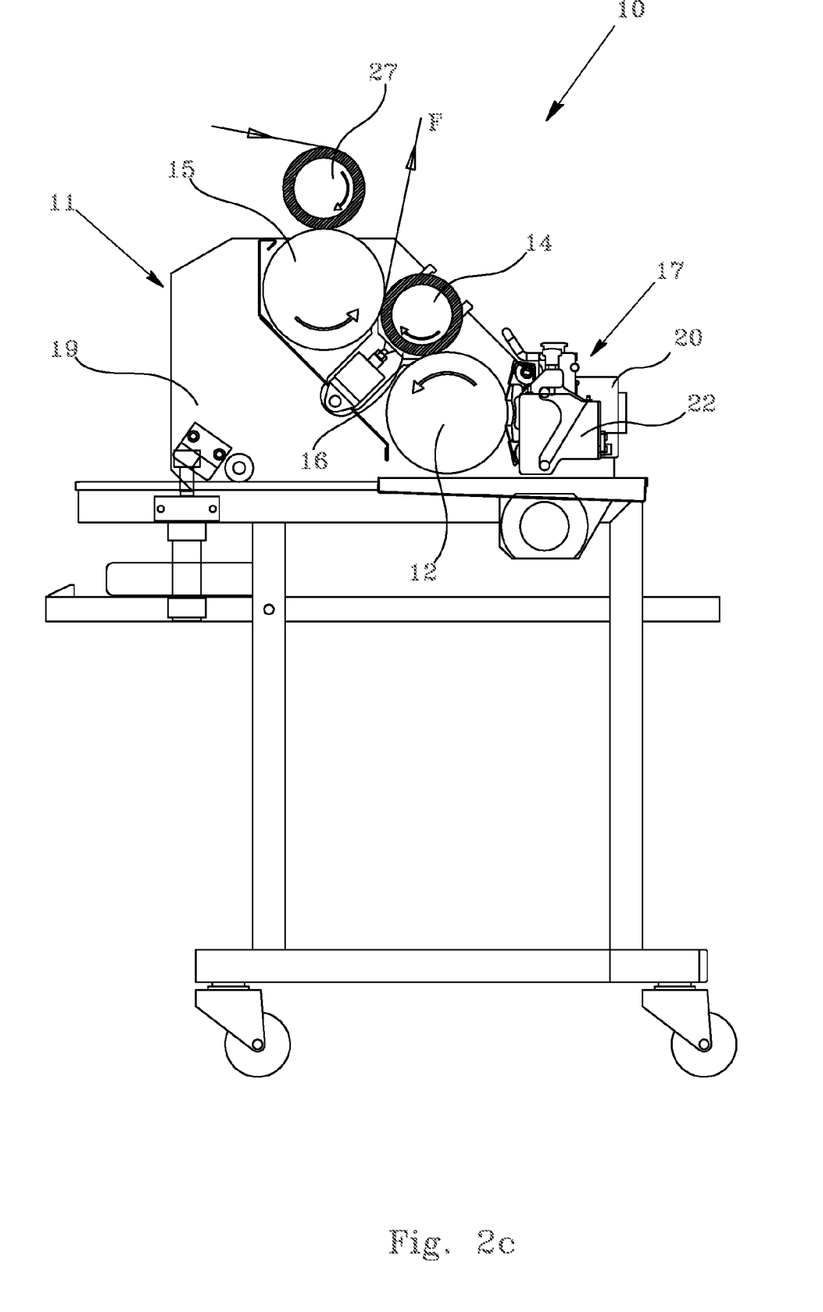
FIG. 2c shows a side view of the spreading unit shown in FIG. 1a during operation.
Figure 3A:
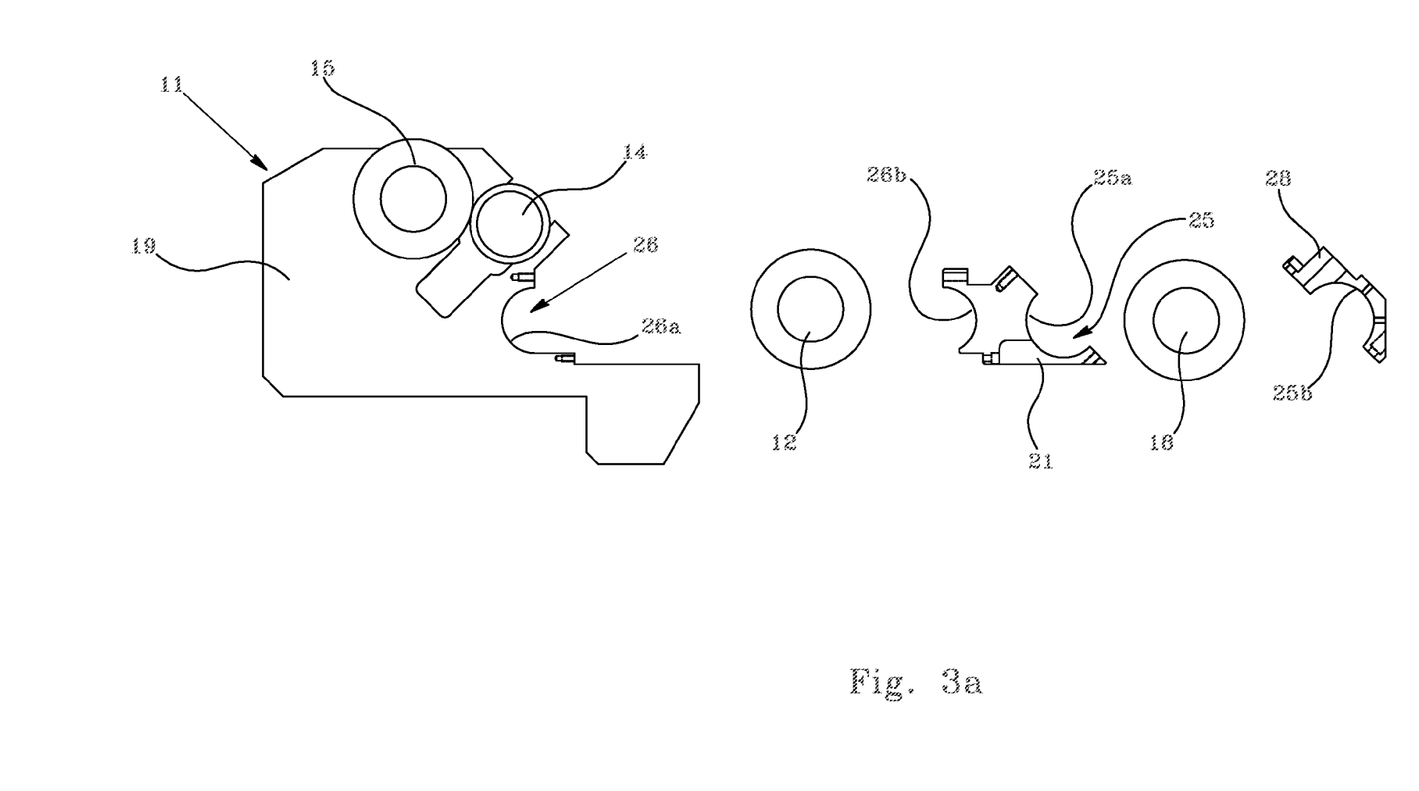
FIG. 3a shows an exploded side view of the spreading unit, according to the invention, in a configuration for use with high-viscosity adhesives.
Figure 3B:
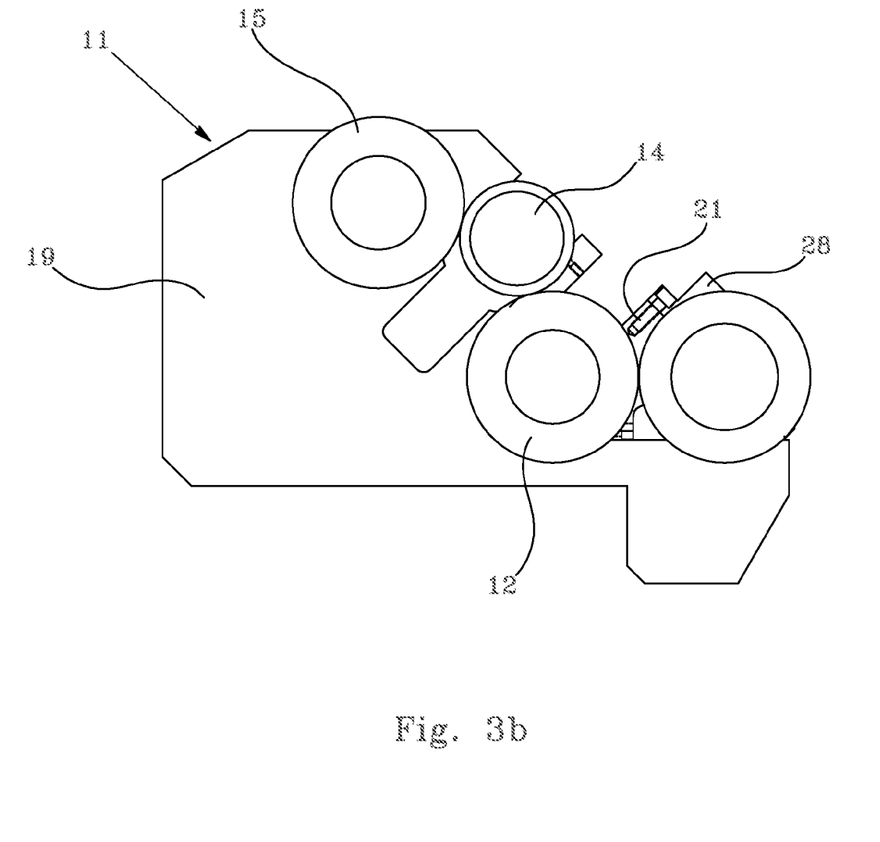
FIG. 3b shows a side view of the spreading unit shown in FIG. 3a in operational condition.
Figure 3C:
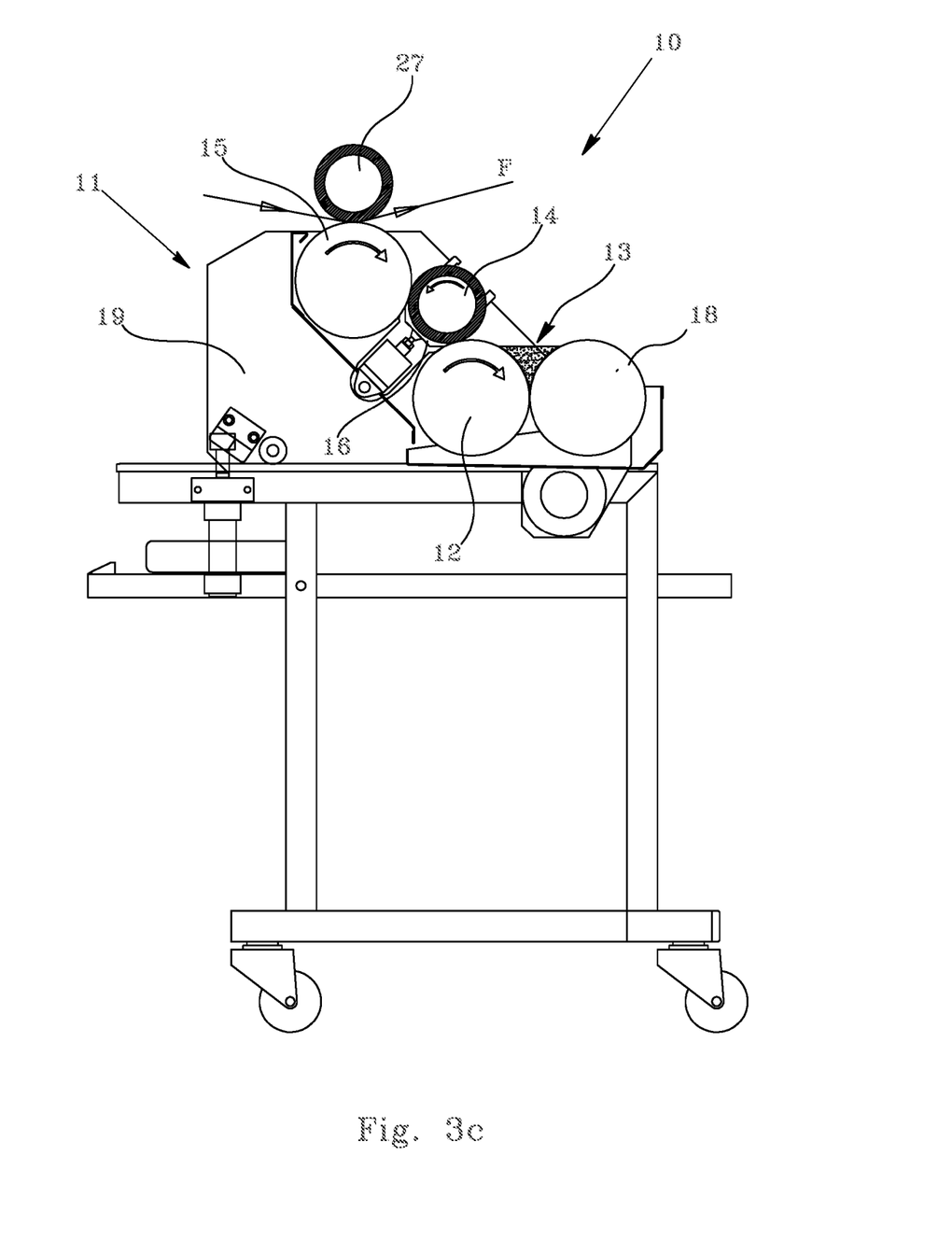
FIG. 3c shows a side view of the spreading unit shown in FIG. 3a during operation.

Operation of the spreading unit, in this operational condition, involves a film F being partially wound onto the third roller 15 and passed between it and the second roller 14 from which it collects the adhesive in the form of a thin layer (FIG. 2c).

As mentioned previously, said moving portion 21 can alternatively be configured to house a fourth roller 18 placed adjacent to and almost in contact with the first roller 12. Said fourth roller 18 does not rotate but remains fixed on its axis. More specifically, on said moving portion there is a seat 25 for housing the support shaft of said fourth roller 18, in a manner similar to the first and third roller 12, 15.

Even more specifically, said moving portion 21, in this configuration, is shaped to keep said rollers 12, 18 at a distance (gap) of just a few hundredths of a millimeter from one another.

The adhesive is fed into the collection zone 13, which in this case is located in the upper part of the two rollers 12, 18, so that following the rotation of the first roller 12 a thin layer of adhesive remains on it, applied through the gap of a few hundredths of a millimeter.

In this configuration, said first roller 12 can have a completely smooth surface, preferably made of chromium steel.

Said layer of adhesive is then transferred from the first roller 12 to second roller 14 and then to the third roller 15, with each roller rotating faster than the previous roller, making the layer of adhesive even thinner.

The spreading unit thus configured is therefore suited to working with high-viscosity adhesives, such as solvent-free adhesives.

According to the invention, on said moving portion 20, 21 of the abutment 11 there is at least in part a seat 26 for housing the support shaft (not shown in the figure) of said first pick-up roller 12.

In practice, a part 26b of said seat is on said moving portion 20, 21 of the abutment 11 and a remaining part 26a is on the fixed portion 19.

When the moving portion 20, 21 is connected to the fixed portion 19, the seat 26 is capable of housing and retaining the shaft of the first roller 12.

In this manner, by removing and replacing the moving portion 20, 21 of each abutment, it is possible both to replace the tank 17 with the fourth roller 18 (or vice-versa), and to replace the first roller 12 with another having a completely smooth surface or an anilox type with an engraved surface.

With a few simple operations, therefore, the spreading unit can be transformed to be used with low-viscosity adhesives, such as solvent-based adhesives, or with high-viscosity adhesives such as solvent-free adhesives.

Preferably, said moving portion 21, when configured to house the fourth roller 18, can be shaped so as to keep the first roller 12 and said fourth roller 18 with their axes aligned on a substantially horizontal plane. This enables the upper part between the two rollers to be used to house the adhesive collection zone 13.

According to a preferred variant, said moving portion 21 may comprise a further moving portion 28 that can be firmly connected to it, in which there is a part 25b of the seat 25 for housing the shaft of said fourth roller 18.

The remaining part 25a of the seat 25, on the other hand, is in the moving portion 21.

This conformation enables even easier mounting and removal of the fourth roller 18 on the abutments 11 of the spreading unit.

According to another variant, the spreading unit may also comprise a fifth presser roller 27 that rotates in contact with the third roller 15.

When the spreading unit is configured to work with low-viscosity adhesives, the film F is partially wound around the third roller 15 by an angle determined by the points of contact of said third roller 15 with the second roller 14 and with said fifth presser roller 27 respectively.

Conversely, when the spreading unit is configured to work with high-viscosity adhesives, the film F is partially wound onto said fifth presser roller 27 at a variable angle, so that it comes into contact with the third roller at an adhesive collection point.

Also according to another preferred variant, the first pick-up roller 12 and/or the third roller 15 and/or the fourth roller 18 may be provided with heating means for heating the surface, when necessary.

Advantageously, said means may comprise passages on the inside of the roller and beneath the surface, in which it is possible to circulate a heat-carrying fluid (water or equivalent solutions) heated by specific heating units.

This is particularly useful when the spreading unit is used with solvent-free adhesives or other high-viscosity adhesives that need to be kept at temperatures higher than room temperature to keep them at a viscosity that enables them to be spread.

Similarly, if necessary, the rollers can be cooled quickly by circulating a low-temperature liquid inside them.

Thanks to the present invention, it is possible to produce a unit for spreading an adhesive onto a moving film that can operate with different types of adhesives, particularly with adhesives having considerably different viscosities, such as solvent-based adhesives and solvent-free adhesives for example.

Specifically, the spreading unit thus configured can be prepared for use with a given type of adhesive in just a few minutes by applying the moving portions 20, 21 configured to house the blade chamber 22 or to house the fourth roller 18.

Similarly, a first roller 12 provided with an engraved surface can be mounted easily, for use with the blade chamber 22, or with a smooth surface to be used in conjunction with the fourth roller 18.

The spreading unit according to the present invention also does not have the construction complexities of known devices, while managing to retain the same reliability and manufacturing costs.

The present invention, as described and illustrated, may be subject to various modifications and variants, all of which fall within the scope of the invention; furthermore, all the details may be replaced with other technically equivalent elements.

The invention claimed is:

1. Unit for spreading an adhesive onto a moving film, comprising at least one pair of abutments (11) upon which is mounted:
   a first pick-up roller (12) arranged for collecting a quantity of adhesive from a collection zone (13);
   a second roller (14) that rotates in contact with said first roller (12), arranged to receive said quantity of adhesive;
   a third roller (15) that rotates in contact with said second roller (14);
   wherein said abutments (11) comprise one fixed portion (19) and at least a moving portion (20, 21) that is firmly connectable to the fixed portion, wherein on said moving portion (20, 21) there is a part (26b) of a seat (26) for housing a support shaft of the first pick-up roller (12), and wherein on said fixed portion (19) there is a remaining part (26a) of said seat (26) arranged for housing said support shaft of said first pick-up roller (12),
   wherein said moving portion (20, 21) houses:
   in a first configuration, a tank (17) including said adhesive collection zone (13), so that at least one part of the surface of the first roller (12) can come into contact with said adhesive collection zone (13), and
   in a second configuration, an additional fourth roller (18) which is maintained at a given distance from said first roller (12), said collection zone (13) being located in the upper space between said first and said fourth roller (12, 18).

2. Unit for spreading an adhesive, according to claim 1, wherein said moving portion (20, 21) can be firmly connected to said fixed portion (19) by screws or similar.

3. Unit for spreading an adhesive, according to claim 1, wherein said moving portion (21) is configured to keep the axes of the first roller and fourth roller (12, 18) aligned on a substantially horizontal plane.

4. Unit for spreading an adhesive, according to claim 3, further comprising an additional moving portion (28), that is firmly connectable to the moving portion (21), on which there is a part (25*b*) of a seat arranged for housing the shaft for the fourth roller (18).

5. Unit for spreading an adhesive, according to claim 1, wherein said tank (17) comprises a blade chamber (22) firmly mounted on the moving portion (20) by brackets (23).

6. Unit for spreading an adhesive, according to claim 1, wherein said first pick-up roller (12) has a smooth surface or a surface provided with a plurality of incisions.

7. Unit for spreading an adhesive, according to claim 1, comprising a fifth press roller (27) that rotates in contact with the third roller (15), the film being partially wound around said third roller (15) at an angle between the contact points of said roller (15) with respect to the second roller (14) and to said fifth press roller (27).

8. Unit for spreading an adhesive, according to claim 1, wherein said first roller (12) and/or said third roller (15) and/or said fourth roller (18) are provided with heating means for heating the surface.

\* \* \* \* \*